B. F. SCHMIDT.
CAMERA SHUTTER CONTROL.
APPLICATION FILED JULY 5, 1919.
1,385,476.
Patented July 26, 1921.
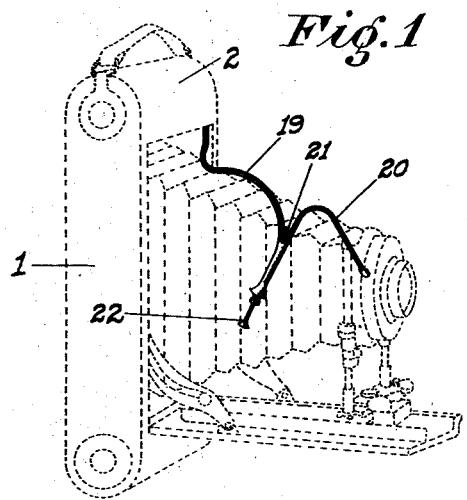
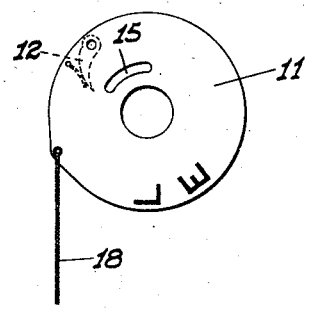
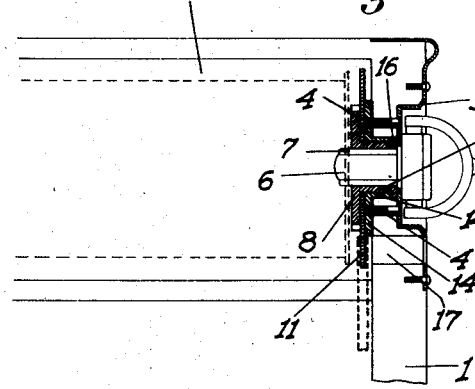
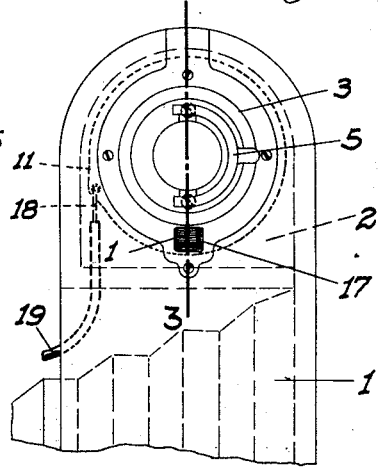
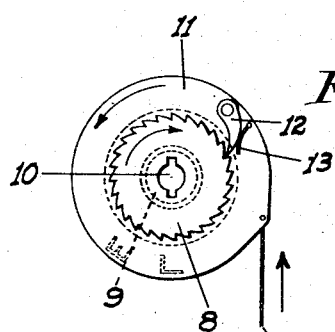
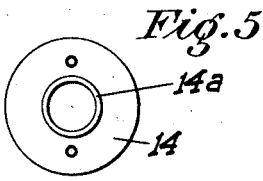
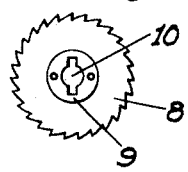
INVENTOR.
B. F. Schmidt
BY
ATTORNEY

UNITED STATES PATENT OFFICE.

BENJAMIN F. SCHMIDT, OF EXETER, CALIFORNIA.

CAMERA-SHUTTER CONTROL.

1,385,476.　　　　　Specification of Letters Patent.　　Patented July 26, 1921.

Application filed July 5, 1919. Serial No. 308,764.

*To all whom it may concern:*

Be it known that I, BENJAMIN F. SCHMIDT, a citizen of the United States, residing at Exeter, in the county of Tulare and State of California, have invented certain new and useful Improvements in Camera-Shutter Controls; and I do declare the following to be a full, clear, and exact description of the same, reference being had to the accompanying drawings, and to the numerals of reference on the drawings, which form a part of this application.

This invention relates to improvements in camera shutter control mechanisms, and particularly to that type of hand cameras generally used for amateur photography and which are designed to use film-rolls therein, and in which the shutter is actuated by a spring-pressed flexible cable or wire.

When taking photographs with this type of camera, the user frequently forgets, after exposing a section of the film, to wind the same around on its spool to present a fresh portion of the film for exposure when the shutter is again opened. In this case, a double exposure on the one film-section is the result, and both photographs are spoiled.

Or again, many times the operator, being in doubt on the matter, and to be on the safe side, will wind the film on its spool, when in reality the previous film-section has not been exposed. In this case, while nothing is actually spoiled, a portion of the length of the film-roll will not be utilized, which is a needless waste of the same.

The principal object of my invention therefore is to provide a means, actuated by the shutter operating mechanism, tending to prevent the shutter from being opened more than once without winding the film on its spool to present a new section thereof for exposure.

With this device therefor, the operator of the camera will be free from worry, for if the shutter actuating cable "snaps" the shutter when pressed in, he may be sure that he is not making a new exposure over a previous one, while on the other hand, if the cable refuses to actuate the shutter, the operator will know that he has not wound the film on its spool since taking the previous exposure, and will then proceed to do so.

Although the shutter may be again actuated after the film has been partially turned from an exposed position, it is reasonably certain that the operator, when once starting to wind the film-spool, will continue this operation without stopping until an entirely unexposed section of film is presented to the lens.

I also provide visible indicating means whereby the operator may tell whether the film has been exposed or otherwise, thus eliminating even the feeling that one might be using the same film twice and makes it doubly fool-proof.

Another object of my invention is to provide a simple and inexpensive device, and one which may be installed in any of the modern cameras of the type mentioned, without necessitating any structural alterations therein.

These objects I accomplish by means of such structure and relative arrangements of parts as will more fully appear from a perusal of the following specifications and claims.

On the drawings, similar characters of reference indicate corresponding parts in the several views, in which:—

Figure 1 is a perspective outline of a folding hand-camera, showing a split-cable actuating means for the shutter and for the shutter-control lock.

Fig. 2 is a fragmentary end elevation of the camera, on the side thereof having the film-winding handle projecting therefrom.

Fig. 3 is a cross section taken on a line 3—3 of Fig. 2.

Fig. 4 is an assembly view of my shutter control locking device, looking at the inside of the camera, and showing the same detached from the camera.

Fig. 5 is a view of a stationary mounting ring or disk.

Fig. 6 is a view of a movable pawl-disk, showing the actuating cable attached thereto.

Fig. 7 is a view of a ratchet disk or wheel.

Referring now more particularly to the numerals of reference on the drawings, the numeral 1 denotes the casing of the camera having the usual chamber 2 at one end thereof adapted to receive a film-roll therein. On the outside of this chamber and central thereof is a countersunk or cupped plate 3 secured to the material of the casing 1 by suitable screws 4. The usual handle 5 for winding up the film spool projects from the plate 3, and is connected for movement in one direction only, as is customary, to a shaft 6 extending into the chamber 2 and provided with longitudinal and diametrical lugs 7 adapted to project into the usual slotted orifice provided in the film spool.

My invention comprises essentially a ratchet wheel 8 having a hub 9 thereon, which is provided with a slotted orifice 10 adapted to receive the lugged shaft 6 therethrough. Turnable on the hub 9 is a plate or disk 11 on which is mounted a pawl 12 normally held in contact with the teeth of the ratchet wheel 8 by a spring 13 pressing thereagainst. The teeth of this wheel are so pointed or angled that when the shaft 6, to which the wheel 8 is connected, is turned, the pawl 12 will be unlocked or withdrawn from contact with the teeth.

Also mounted on the hub 9 is a disk 14, which bears against the casing 1 and is secured thereto by means of the same screws 4 as hold the plate 3 in place. One of these screws projects slightly beyond the plane of the disk 14, and is adapted to ride in a curved slot 15 provided in the plate 11, movement of the latter being thus limited by the length of the slot. The hub 9 of the member 8 has a washer 16 secured thereto and projecting over the hub 14ᵃ of the disk 14, so that when the disk 14 is held in position by the screws 4, the members 11 and 8, which lie closely against each other, are also held from displacement.

The plate 11 is somewhat larger in diameter than the disk 14, and is provided at suitable points in the portion thus projecting, and on the side thereof toward the casing 1, with spaced letters, such as "E" and "L", to indicate the loaded or exposed condition or positioning of the film-roll, either of these letters at a time being visible to the user of the camera through a slot 17 provided through the casing 1 and the plate 3.

A flexible wire or cable 18 is secured to the edge of the plate 11, and extends through a suitable housing 19 to a predetermined point in the length of the shutter actuating cable 20, when it is connected to the same at an acute angle, as shown at 21, both cables then extending as one to the press-button 22 commonly provided on the cameras to actuate the shutter cable. This being now a well known form of shutter control means, it is sufficient to state that a coiled spring in the cable housing adjacent the button 22 normally pulls back on the shutter-cable when it has been pressed in by the button 22, and thus places the cable in position to be again moved to actuate the shutter.

In the operation of the device, referring particularly to Fig. 4 of the drawings, when the button 22 is pressed in to operate the shutter, the cable will also be moved an equal distance in the direction of the arrow, and the plate 11 will turn and cause the pawl 12 thereon to click past some of the teeth of the ratchet wheel 8. At the same time the letter "E" on the plate will become visible through the slot or window 17, indicating that an exposure has been made. When the pressure is removed from the button 22, the tendency of the cables 18 and 20 is to return to their normal positions, due to the pull of the spring as previously described. The cable 18 however cannot do so, owing to the fact that the pawl 12 is then seated in one of the ratchet teeth, and the force necessary to turn the ratchet wheel 8, the same being connected to the shaft 6 which winds the film-roll, is greater than the strength of the cable-spring, and hence the button 22 will remain in its pressed down position, and the shutter cannot be actuated.

When the handle 5 is turned to wind up the film which movement is always in the direction of the arrow on the ratchet wheel 8 in Fig. 4, the teeth on this wheel move away from the pawl 12, and the pull of the cable-spring then turns the plate 11 back to its normal position, the movement thereof being limited as previously stated by the slot 15 therein.

The coming back to normal position of the operating cable has then turned the plate 11 until the letter "L" thereon appears under the slot 17, thus indicating that the camera is "loaded," or ready for another exposure to be made.

The handle 5 is of course turned the necessary number of revolutions to correctly position the film, no movement of the plate 11 taking place after the first turning movement thereof, the pawl 12 raising to permit the teeth of the ratchet wheel passing thereunder.

From the foregoing description it will be readily seen that I have produced such a device as substantially fulfils the objects of the invention as set forth herein.

While this specification sets forth in detail the present and preferred embodiment of my device, still in practice such deviations from such detail may be resorted to as do not form a departure from the spirit of the invention, as defined by the appended claims.

Having thus described my invention, what I claim as new and useful, and desire to secure by Letters Patent is:—

1. In combination with the spool winding shaft of a film-roll camera having a shutter actuated by a spring-pulled cable, a ratchet wheel mounted on the shaft and turnable therewith, a plate mounted on the hub of the wheel and turnable thereon, a spring-pressed pawl on said plate adapted to engage the ratchet wheel, and a cable attached to the plate and extending to and branching from the shutter cable and movable therewith, the teeth on the wheel being so positioned that the pawl on the plate will freely slide over said teeth when the plate is turned by the moving of the cable to actuate the shutter, said direction of movement being opposite to the direction of rotation of the ratchet wheel when the latter is turned to wind the film-spool.

2. In combination with the spool winding shaft of a film-roll camera having a shutter actuated by a spring-pulled cable, a ratchet wheel mounted on the shaft and turnable therewith, a plate turnably mounted on the hub of the wheel, a spring-pressed pawl on said plate adapted to engage the ratchet-wheel, a cable attached to the plate and extending to and branching from the shutter cable and movable therewith, the plate being arranged to move without moving the ratchet-wheel when the cables are pressed to actuate the shutter, and means for limiting the movement of the plate.

3. In combination with the spool winding shaft of a film-roll camera having a shutter actuated by a spring-pulled cable, a ratchet wheel mounted on the shaft and turnable therewith, a plate turnably mounted on the hub of the wheel, a spring-pressed pawl on said plate adapted to engage the ratchet-wheel, a cable attached to the plate and extending to and branching from the shutter cable and movable therewith, the plate being arranged to move without moving the ratchet wheel when the cables are pressed to actuate the shutter, a pin fixed to the camera-frame and projecting into the plane of the plate, the latter being provided with a slot of predetermined length in which the pin rides.

In testimony whereof I affix my signature in presence of two witnesses.

BENJAMIN F. SCHMIDT.

Witnesses:
 BERNARD PRIVAT,
 VERADINE WARNER.